Aug. 28, 1951 — A. H. KRAFT — 2,565,924
MACHINE TOOL ANGLE BAR
Filed July 8, 1946 — 2 Sheets-Sheet 1

Inventor
Alfred H. Kraft

Aug. 28, 1951  A. H. KRAFT  2,565,924
MACHINE TOOL ANGLE BAR
Filed July 8, 1946  2 Sheets-Sheet 2
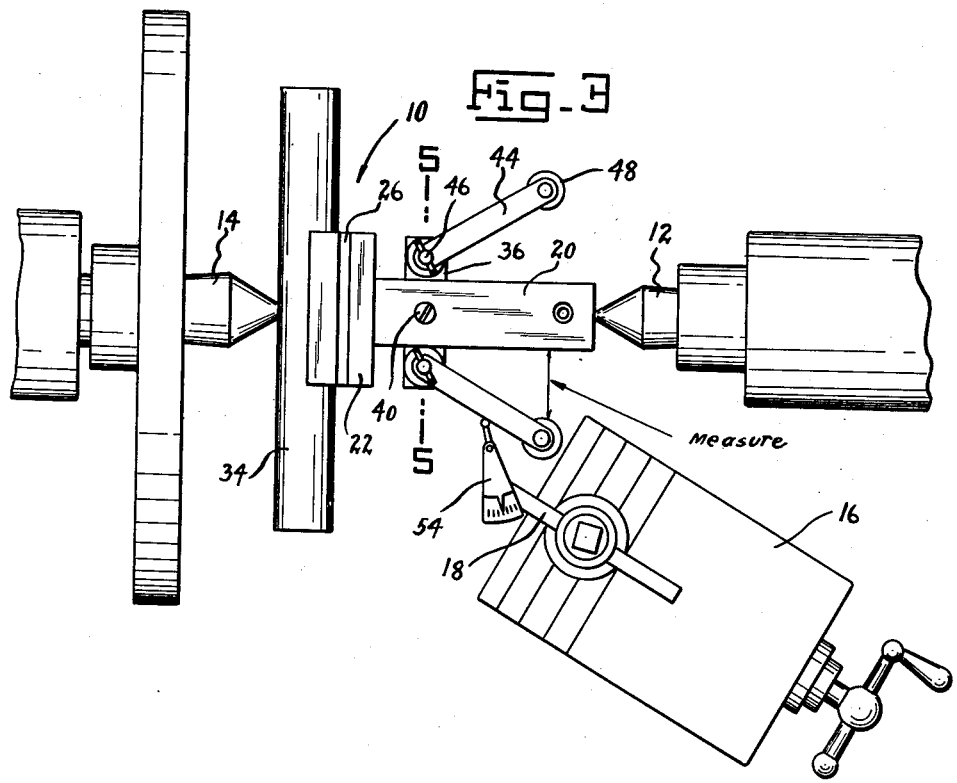
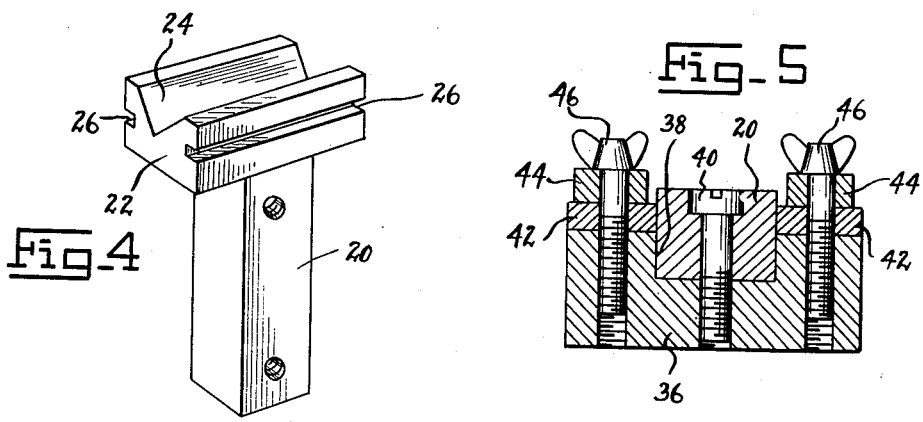
Inventor
Alfred H. Kraft
By Clarence A. O'Brien
and Harvey B. Jacobson
Attorneys Patented Aug. 28, 1951

2,565,924

UNITED STATES PATENT OFFICE 2,565,924

MACHINE-TOOL ANGLE BAR

Alfred H. Kraft, New Orleans, La.

Application July 8, 1946, Serial No. 682,064

3 Claims. (Cl. 33—185)

My invention comprises novel improvements in a machine tool angle bar and more specifically pertains to an angle measuring tool for setting the compound tool head on a lathe, shaper, planer and milling machine, and that being of universal utility can be used in like manner on other machines to cut at any predetermined angle.

The principal purpose of this invention is to devise an attachment which may be installed in a lathe, shaper, planer, grinder, boring mill or other machine in order to quickly adjust the compound head and tool in order to cut any desired angle on the work.

Ancillary objects reside in providing an attachment which may be mounted in a variety of positions in a lathe to assist and facilitate the adjustment of the tool support.

These, together with various other objects of the invention, to become later apparent as the following description proceeds are attained by my invention, one embodiment of which has been illustrated by way of example only in the annexed drawings wherein:

Figure 3 is a top plan view showing a second manner of utilizing the invention;

Figure 4 is a perspective view of an element of the device;

Figure 5 is a transverse sectional view taken substantially upon the line 5—5 of Figure 3.

Figure 1:
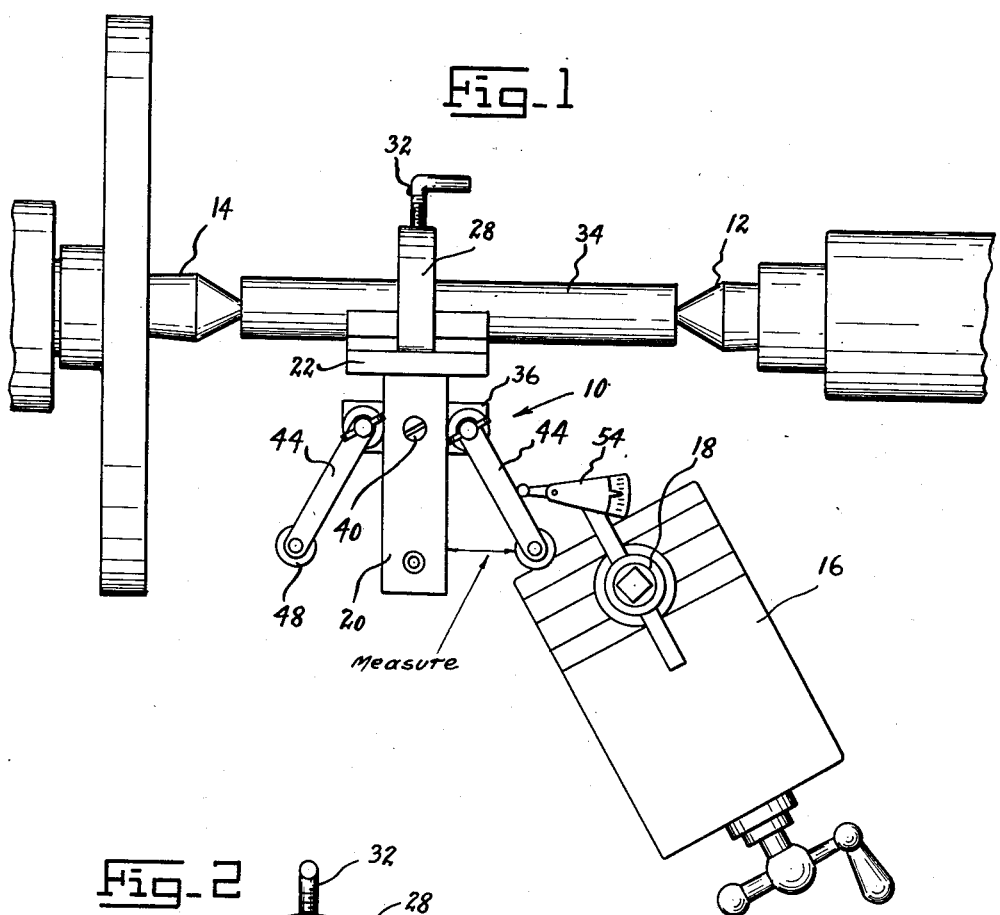
Figure 1 is a top plan view showing one manner of employing the invention.

Referring now to the drawings in detail, numeral 10 designates generally my improved angle gauge which is adapted for use with a lathe consisting of the usual tail stock 12 and head stock 14. As shown best in Figures 1 and 3, the lathe also includes the compound tool head 16 having adjustably positioned thereon a tool support as at 18. As so far described, the lathe is of general and well-known construction and in itself forms no part of my invention. The gauge 10 consists of a generally rectangular post or stock 20 having at one end thereof an enlarged transversely disposed head 22 which may be integrally or otherwise rigidly attached to the stock 20. Extending longitudinally of its length, the head 22 is provided with a V-shaped groove 24 and a pair of parallel longitudinal grooves 26 formed in the sides of the head. As shown more clearly in Figure 2, the grooves 26 are adapted to be engaged in a detachable manner, by means of a U-shaped clamp 28 having inturned flanges 30 adapted for removable engagement with the groove 26. Centrally thereof, the clamp 28 is apertured and threaded to receive the screw threaded manually adjustable bolt 32 adapted to press against the cylindrical surface of a rod 34 and securely clamp the same against the V-shaped seat 24.

Extending transversely of the stock 20, adjacent the enlarged head 22, is a cross member 36 having a socket or recessed portion 38 for snugly embracing the sides of the stock 20. Any suitable fastening means such as the bolt 40 is provided for securely and rigidly attaching the cross arm 36 to the stock 20. Pivoted to each extremity of the cross arm 36 and spaced therefrom as by washers 42, are a pair of depending arms 44 pivotally and adjustably secured as by bolts 46. The outer ends of the arms 44 are provided with rollers 48.

Figure 6:
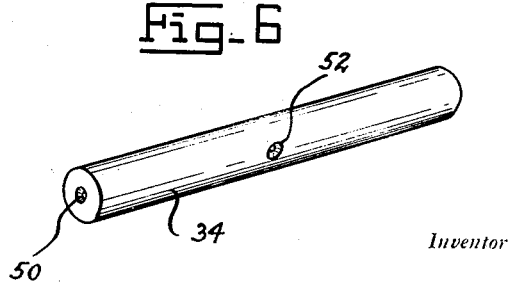
Figure 6 is a perspective view of another element of the invention.

As shown best in Figure 6, the support rod 34 is provided at each extremity with an axially disposed recess 50 adapted to receive the center pieces 12 and 14 of the tail and head stocks respectively of the lathe. At its central portion, the rod 34 is provided with a radial recess 52 while the free end of the stock 20 is provided with a similar recess not shown, these recesses being adapted to receive the aforementioned points of the lathe.

Figure 2:
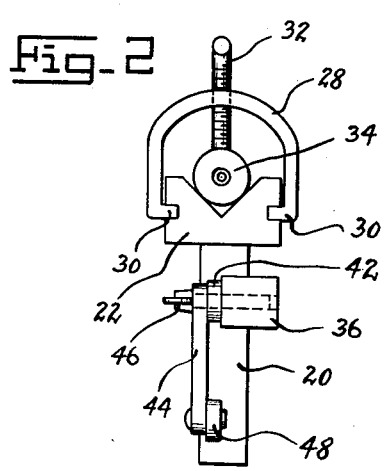
Figure 2 is a vertical end view of my invention.

From the foregoing it is believed that the manner of employing the invention will now be readily apparent. When it is desired to cut a taper, or to machine a given surface at a predetermined angle upon a lathe, the cutting bar is adjustably positioned by proper manipulation of my gauge, as follows. As shown in Figure 1, the support rod 34 is journalled between the center pieces 12 and 14 of the lathe in a conventional manner. The stock piece 20 is secured in convenient position transversely of the support rod 34 by means of the clamp 28 and the adjusted bolt 32. An arm 44 is now inclined at the proper angle relative to the stock 20 and consequently to the axial center of the lathe; this adjustment is best effected by pivoting the bar 44 until the roller 48 is disposed at a predetermined distance from the side of the stock member 20, this distance being a fixed function of the angle made by the bar 44 with the stock 20 and being readily determinable by proper calculation from the tables of geometric functions of angles depending upon the manner of using the gauge. When the bar 44 has been adjusted as set forth above, a gauge 54 is mounted in the tool post 18 of the compound head 16 and the latter is manipulated until it is approximately at the desired angle. The angular position of the head 16 is now adjusted inwardly and outwardly of the axial center of the lathe whereby the gauge 54 bears against the bar 44 throughout its length. The angular position of the head 16 is now adjusted until the gauge 54 shows the same reading as it travels from one end to the other of bar 44. When this result has been obtained, the gauge 54 is removed, the requisite tool is attached to the tool post 18, the angle gauge 10 together with its support bar 34 is removed from the lathe centers, and the desired work piece is mounted thereon. The tool is then ready to make the necessary cut at the appropriate angle.

In some types of work, it may be found more convenient to dispose the angle gauge with the stock piece 20 aligned with rather than transverse of the lathe centers. For this purpose, the clamp 28 and adjusting bolt 22 are removed and the central aperture or recess 52 is disposed in either the head or tail piece of the lathe, while the axial recess at the free end of the stock 20 is disposed to engage the other tail piece. An arm 44 is now angularly disposed at the desired angle relative to the stock piece 20, in the same manner as set forth. Similarly, the compound head 16 and the tool post 18 carrying a gauge 54 is adjusted until the compound head 16 has the desired movement, parallel to the inclination of the bar 44. As before, the gauge 54 is removed, a suitable tool is positioned in the compound head 16, and the angle gauge 10 is removed from the lathe and replaced by the work.

It will be readily seen, that by this device, the work tool of a lathe can be quickly and easily adjusted to give the desired angle of cut, and the work can then be installed in the lathe and operated upon without further adjustment. As will be seen from the foregoing, my improved angle gauge may be easily installed in a plurality of positions in a lathe in order to meet the exigencies of any particular situation.

Since it will be evident that the principles of this invention may be practiced by various embodiments, I do not wish to limit myself to the exact construction shown and described, but may avail myself of any suitable modifications falling within the scope of the appended claims.

I claim as my invention:

1. An angle gauge comprising a stock having a side wall parallel to the longitudinal axis thereof, an end wall perpendicular to said side wall, a head attached to said end wall perpendicular to the longitudinal axis of said stock, a cross member having a transverse recess therein, said stock being slidably received in said recess, means selectively locking said cross member in predetermined longitudinally adjusted positions on said stock, clamp means detachably securing said head to the work support of a metal working machine, a guide bar adjustably pivotally attached to said cross member, said head having a longitudinally extending V-shaped groove therein and said groove defining walls in said stock which diverge equally from the longitudinal axis of said stock.

2. An angle gauge comprising a stock having a side wall parallel to the longitudinal axis thereof, an end wall perpendicular to said side wall, a head attached to said end wall perpendicular to the longitudinal axis of said stock, a cross member having a transverse recess therein, said stock being slidably received in said recess, means selectively locking said cross member in predetermined longitudinally adjusted positions on said stock, clamp means detachably securing said head to the work support of a metal working machine, a guide bar adjustably pivotally extending V-shaped groove therein, said groove defining walls in said stock which diverge equally from the longitudinal axis of said stock, said head having a shoulder thereon extending transverse the longitudinal axis of said stock and said clamp means engaging said shoulder.

3. An angle gauge comprising a stock having a side wall parallel to the longitudinal axis thereof, an end wall perpendicular to said side wall, a head attached to said end wall perpendicular to the longitudinal axis of said stock, a cross member having a transverse recess therein, said stock being slidably received in said recess, means selectively locking said cross member in predetermined longitudinally adjusted positions on said stock, clamp means detachably securing said head to the work support of a metal working machine, a guide bar adjustably pivotally attached to said cross member, said head having a shoulder thereon extending transverse the longitudinal axis of said stock, said clamp means engaging said shoulder, first and second disks of equal diameter attached to opposite ends of said guide bar, a pivot pin on said cross member extending through said guide bar and said first disk, the edge of said first disk abutting said side of said stock and means selectively locking said guide bar to said cross member in predetermined angular positions.

ALFRED H. KRAFT.

REFERENCES CITED

The following references are of record in the file of this patent:

UNITED STATES PATENTS

| Number | Name | Date |
| --- | --- | --- |
| 1,476,573 | Allen | Dec. 4, 1923 |
| 1,686,318 | Gallasch | Oct. 2, 1928 |
| 2,343,637 | Bochenek | Mar. 7, 1944 |

FOREIGN PATENTS

| Number | Country | Date |
| --- | --- | --- |
| 177,897 | Great Britain | Apr. 13, 1922 |
| 309,435 | Germany | Nov. 18, 1918 |
| 328,295 | Germany | Oct. 27, 1920 |
| 815,392 | France | Apr. 12, 1937 |

OTHER REFERENCES

Pub.: "American Machinist" Magazine, Feb. 1, 1933, pp. 90, 91, "A Combination Sine Plate," Discussion by Henry W. Boehly.